(12) United States Patent
Frauhammer et al.

(10) Patent No.: US 8,069,712 B2
(45) Date of Patent: Dec. 6, 2011

(54) METHOD FOR THE DIAGNOSING OF A CATALYTIC CONVERTER LOCATED IN AN EXHAUST GAS FLOW, AND DEVICE FOR CARRYING OUT SAID METHOD

(75) Inventors: Joerg Frauhammer, Gemmrigheim (DE); Uwe Mueller, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 144 days.

(21) Appl. No.: 12/096,561

(22) PCT Filed: Nov. 13, 2006

(86) PCT No.: PCT/EP2006/068370
§ 371 (c)(1),
(2), (4) Date: Sep. 29, 2008

(87) PCT Pub. No.: WO2007/065770
PCT Pub. Date: Jun. 14, 2007

(65) Prior Publication Data
US 2009/0151326 A1    Jun. 18, 2009

(30) Foreign Application Priority Data
Dec. 8, 2005    (DE) .......................... 10 2005 059 055

(51) Int. Cl.
*G01M 15/10*    (2006.01)
(52) U.S. Cl. .................................................. 73/114.75

(58) Field of Classification Search ............... 73/114.75; 60/277
See application file for complete search history.

(56) References Cited

U.S. PATENT DOCUMENTS

| | | | | |
|---|---|---|---|---|
| 5,590,521 A | * | 1/1997 | Schnaibel et al. | 60/274 |
| 5,729,971 A | * | 3/1998 | Matsuno et al. | 60/277 |
| 6,158,212 A | * | 12/2000 | Tanaka | 60/277 |
| 6,378,359 B1 | * | 4/2002 | Dobson et al. | 73/114.75 |
| 6,668,544 B1 | * | 12/2003 | Baerts | 60/277 |
| 6,883,307 B2 | * | 4/2005 | Iihoshi et al. | 60/277 |
| 6,912,840 B2 | | 7/2005 | Posselt et al. | |
| 2003/0046924 A1 | * | 3/2003 | Iihoshi et al. | 60/277 |
| 2003/0177760 A1 | * | 9/2003 | Posselt et al. | 60/277 |
| 2009/0151326 A1 | | 6/2009 | Frauhammer et al. | |

FOREIGN PATENT DOCUMENTS

| | | |
|---|---|---|
| DE | 1975158 | 12/1967 |
| DE | 41 28 823 | 3/1993 |
| DE | 43 38 342 | 5/1995 |
| DE | 44 26 020 | 2/1996 |
| DE | 196 43 674 | 4/1997 |
| DE | 199 28 559 | 1/2001 |
| DE | 199 63 901 | 7/2001 |
| DE | 100 65 125 | 7/2002 |
| DE | 10 2005 041 661 | 3/2007 |
| EP | 1 291 502 | 3/2003 |
| JP | 6229235 | 8/1994 |

* cited by examiner

*Primary Examiner* — Freddie Kirkland, III
(74) *Attorney, Agent, or Firm* — Merchant & Gould, P.C.

(57) ABSTRACT

Disclosed are a method and a device for diagnosing a catalytic converter located in a exhaust gas flow. Said method and device are based on an evaluation of the hygroscopic properties of the catalytic converter.

12 Claims, 2 Drawing Sheets

METHOD FOR THE DIAGNOSING OF A CATALYTIC CONVERTER LOCATED IN AN EXHAUST GAS FLOW, AND DEVICE FOR CARRYING OUT SAID METHOD

TECHNICAL FIELD

The invention is based on the procedure for diagnosing a catalytic converter arranged in an off-gas stream and on the device for the implementation of this procedure according to the category of independent claims.

BACKGROUND

Due to DE 44 26 020 A1 the procedure for diagnosing a catalytic converter arranged in an off-gas stream becomes known, which is based on the evaluation of at least one temperature, that is influenced by a possibly happening exothermic reaction in the catalytic converter. The already known catalytic-diagnose is implemented on the basis of two temperature signals. The first temperature signal provides a temperature sensor, which is arranged downstream after the catalytic converter. The second temperature signal is attained by a temperature model in the catalytic converter. Both temperature signals are balanced in a preset operating condition of a combustion engine, in whose exhaust gas area the catalytic converter is arranged. The temperature obtained by the temperature model can be achieved either on the basis of a fully inoperative catalytic converter, a fully operative catalytic converter or a so-called Grenz catalytic converter, whereby the Grenz catalytic converter shows a conversion ability that lies in between those two extremes, which just complies with the legal stipulations of the conversion ability.

Due to DE 197 51 58 A1 the procedure for diagnosing a catalytic converter arranged in an off-gas stream becomes known, which is based on the evaluation of at least one dimension for the oxygen concentration in the exhaust gas. A first dimension for the oxygen concentration is provided by a lambda sensor, which is arranged downstream after the catalytic converter. A second dimension for the oxygen concentration downstream after the catalytic converter is obtained by a catalytic converter model. A dimension for the difference between the measured and the calculated dimension is evaluated. The catalytic converter diagnose is based on the evaluation of the oxygen capacity of a catalytic converter, whereby it is assumed that a new catalytic converter shows a higher oxygen capacity than an old catalytic converter. The already known procedure particularly evaluates the amplitude of the measured lambda signal, which occurs downstream after the catalytic converter due to the specifically preset lambda modifications upstream before the catalytic converter.

Due to DE 41 28 823 A1 a further procedure for diagnosing a catalytic converter arranged in an off-gas stream becomes known, which is based on the evaluation of at least one dimension for the oxygen concentration in the exhaust gas. The diagnose of the catalytic converter is based on the determination of the oxygen capacity of the catalytic converter. The oxygen capacity is determined by an integral, which considers the sucked in air stream and the exhaust gas lambda upstream before the catalytic converter of a combustion engine, that has the catalytic converter arranged in the exhaust gas area. The integration begins if a lambda modification appears upstream before the catalytic converter, which can for example be specifically preset. The integration ends if a lambda sensor, that is arranged downstream after the catalytic converter, detects occurring modifications of the exhaust gas lambda as a result of the lambda modifications upstream before the catalytic converter.

A further alternative for diagnosing a catalytic converter arranged in an off-gas stream directly includes the ascertainment and evaluation of at least one of the exhaust gas components that need to be eliminated. A corresponding procedure is described in DE 199 63 901 A1. An downstream NOx-sensitive sensor that is arranged after a NOx-storage catalytic converter provides a dimension for the NOx-concentration downstream after the NOx-storage catalytic converter, which is directly used for the diagnose of the NOx-storage catalytic converter.

Due to DE 43 38 342 A1 the procedure of simulating the dimension for an exhaust gas temperature and/or an exhaust gas sensor temperature and/or a catalytic converter temperature, that considers besides the operating parameters of a combustion engine at least one liquid signal, which determines that the occurrence of liquids in the exhaust gas area of the combustion engine and/or the catalytic converter can be expected. During the simulation of a dimension for the temperature the evaporation of the liquid is considered. The already known procedure can be used for instance for the regulation of a filament heating of a sensor that is arranged in the exhaust gas area, whereby the imminent danger of a destruction exists, if a heating is designated simultaneously with a liquid condensation on the sensor's surface.

The liquid is generally water, which condenses on surfaces if the temperature falls below dew point. Because of the existing conditions in the exhaust gas area of a combustion engine the dew point of water is lower than in the ambient air. The deviations rest upon the fact that the steam concentration in the exhaust gas is lower than in the ambient air on the one hand, and on the other hand on the fact that the exhaust gas pressure in the exhaust gas area of a combustion engine is generally higher than the ambient pressure.

Due to DE 100 65 125 A1 a further improvement of the already mentioned DE 43 38 342 A1 described procedure is known, which considers besides the influence of liquid evaporation additionally the evacuation of condensed liquid through the exhaust gas flow.

Finally in DE 10 2005 041 661 a procedure for operating a heating element of a ceramic sensor that is arranged in the exhaust gas area of a combustion engine is described, whereby the heating element is only taken into operation, if the combustion engine is in its operating status, in which it can not be reckoned, that there is any liquid in the exhaust gas area. This specific operating status is indicated when the heat flow, that has been added up over time and carried by the exhaust gas flow, exceeds a preset threshold.

The invention is underlying the purpose of showing a procedure and an implementation for diagnosing a catalytic converter arranged in an off-gas stream, that is simple to implement and allows a reliable diagnose.

The purpose is solved by the indicated features in the independent claims.

SUMMARY

According to the invention the procedure for diagnosing a catalytic converter arranged in an off-gas stream is based on the evaluation of the hygroscopic characteristics of the catalytic converter.

While on the open water surface forces only appear between the water molecules, which have to be overcome during the evaporation of the water, obviously interactions between the interior surface of the catalytic converter and the water molecules on the surface of the condensed water films, which can either occur additionally or can be stronger than the forces between the water molecules, play a role in the catalytic converters. Therefore hygroscopic characteristics means all forms of interactions between the interior surface of a catalytic converter and water located on it. Water is hereafter termed as water film.

The hygroscopic characteristics of the catalytic converter are connected with the available surface of the catalytic converter, which is proportional to the activity of the catalytic converter. According to the invention the procedure for diagnosing a catalytic converter arranged in an off-gas stream is therefore indirectly based on the evaluation or assessment of a dimension for the operative surface of the catalytic converter, which can be used as a dimension for the quality of the catalytic converter.

Advantageous improvements and configurations according to the invention's procedure arise from dependent claims.

An example of an implementation for assessing the hygroscopic characteristics of the catalytic converter provides initially for an assessment for the dimension of the catalytic converter's temperature. Furthermore an assessment of a parameter of a measured temperature is provided for, which occurs during the evaporation of any possibly existing water film in the catalytic converter.

The water film evaporation process requires energy, which has to be provided by the exhaust gas energy. Therefore the temperature-plateau develops until the water film is evaporated.

Preferably the plateau temperature itself is used as a parameter for the temperature-plateau. On the basis of experiments it could be pointed out that a good catalytic converter shows a higher plateau temperature by tendency, than a bad catalytic converter. Alternatively or additionally the duration of the temperature-plateau can be considered. In particular, if the exhaust gas temperature upstream before the catalytic converter and/or the exhaust gas flow through the catalytic converter during the temperature-plateau lie in a range of tolerance, the duration of the temperature-plateau can also be used for diagnosing the catalytic converter, whereas a longer duration corresponds to a better catalytic converter than a shorter duration.

Preferably the range of tolerance is determined depending on the exhaust gas flow and/or the exhaust gas temperature and/or the temperature of the combustion engine, in whose exhaust gas area the catalytic converter is arranged, which are present at the beginning of the ascertainment of the temperature-plateau.

The catalytic converter is for instance—as already mentioned—arranged in the exhaust gas flow of a combustion engine. Configurations may provide that the diagnose of the catalytic converter is designated after a cold starting of the combustion engine and/or after an overrun cut-off of the combustion engine and/or after the turning-off and turning back on of the combustion engine. In these operating conditions of the combustion engine it can be assumed that the temperature-plateau will occur, since previously a lower deviation of the dew point of the steam in the exhaust gas area has likely occurred, which leads to the appearance of a condensed water film.

The occurrence of the temperature-plateau can definitely be expected, if an ascertainment of the temperature-plateau is designated, after the temperature of the catalytic converter sinks below the expected temperature of the temperature-plateau. Provided that the combustion engine is continuously operating, it can be assumed that the temperature-plateau occurs again. According to the continuing process of this configuration it is foreseen that the expected temperature adapts depending on the diagnosis' result. In the case of a catalytic converter, that has been assessed as good, a higher expected temperature for the plateau-temperature can be specified, than in the case of a catalytic converter, that has been assessed as bad.

The invented device for the procedure for diagnosing a catalytic converter arranged in an off-gas stream concerns a controller at first, which is especially customized for the implementation of the procedure. The controller contains preferably at least one electric memory, which stores the steps of the procedure as a computer program.

Further advantageous improvements and configurations of the invented procedure result from additional dependent claims and from the following description.

DETAILED DESCRIPTION

Figure 1:
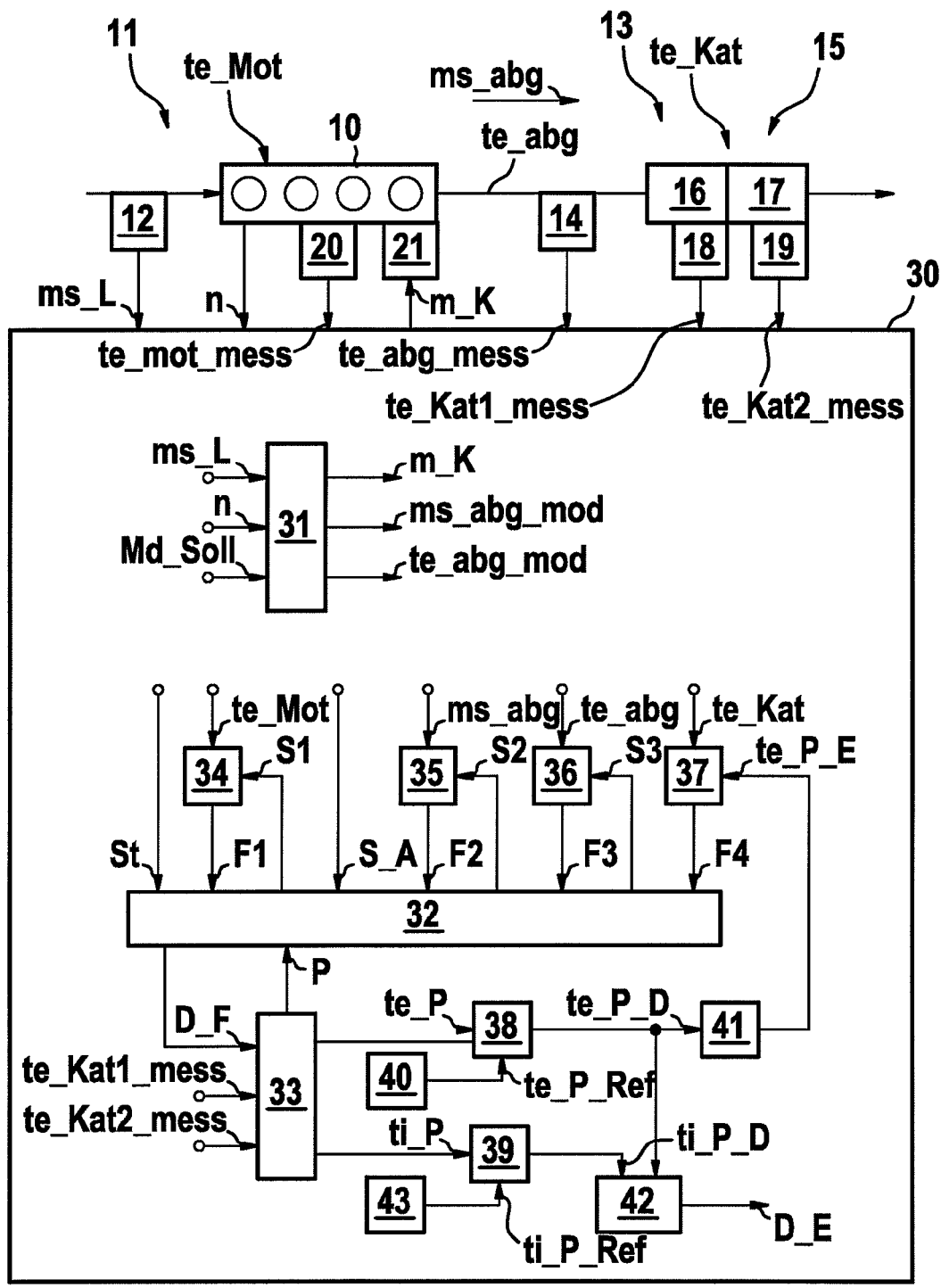
FIG. 1 shows a technical surrounding, where according to the invention a procedure for diagnosing a catalytic converter arranged in an off-gas stream takes place.

FIG. 1 shows a combustion engine 10, that has an air detection 12 in the induction area 11 and an exhaust gas temperature sensor 14 as well as a catalytic converter 15 in the exhaust gas area 13. The catalytic converter 15 is divided into a first catalytic converter section 16 and a second catalytic converter section 17. The combustion engine 10 displays an engine temperature of te_mot.

The catalytic converter 15 displays a catalytic converter temperature of te_Kat. The temperature of the first catalytic converter section 16 is acquired by a first catalytic converter temperature sensor 18 and the second catalytic converter section 17 by a second catalytic converter temperature sensor 19.

An off-gas stream ms_abg as well as an exhaust gas temperature upstream before the catalytic converter 15 occurs in the exhaust gas area 13.

An engine temperature sensor 20 as well as a fuel gauge 21 are assigned to the combustion engine 10.

The air detection 12 provides an air signal ms_L for a controller 30, the combustion engine 10 provides an engine speed n, the engine temperature sensor 20 provides an engine temperature signal te_mot_mess, the exhaust gas temperature sensor 14 provides an exhaust gas temperature signal te_abg_mess, the first catalytic converter temperature sensor 18 provides a first catalytic converter temperature signal te_Kat1_mess and the second catalytic converter temperature sensor 19 provides a second catalytic converter temperature signal te_Kat2_mess. The controller 30 provides a fuel signal m_K for the fuel gauge 21.

The controller 30 contains a fuel signal stipulation 31, which are provided with the air signal ms_L, the engine speed n as well as the torque set point Md_Soll and which provides the fuel signal m_K, a calculated dimension ms_abg_mod for the off-gas stream ms_abg as well as a calculated dimension te_abg_mod for the exhaust gas temperature te_abg.

The controller 30 furthermore contains a diagnose-enabling 32, which is provided with a combustion engine start signal St, a boost deactivation signal S_A as well as four enabling signals F1-F4 and which determines a diagnose enabling signal D_F, which is provided for a temperature-plateau-ascertainment 33.

The first enabling signal F1 provides a first comparator 34, which is supplied with the engine temperature te_mot as well as the engine temperature comparator signal S1. The second enabling signal F2 provides a second comparator 35, which is supplied with the off-gas stream ms_abg as well as the off-gas stream comparator signal S2. The third enabling signal F3 provides a third comparator 36, which is supplied with the exhaust gas temperature te_abg as well as the exhaust gas temperature comparator signal S3. The forth enabling signal F4 provides a forth comparator 37, which is supplied with the catalytic converter temperature te_Kat and a plateau-temperature expectancy value te_P_E. The first to third comparator signals S1-S3 are provided by the diagnose-enabling 32.

The temperature-plateau ascertainment 33 is provided with the diagnose enabling signal D_F and the first catalytic converter temperature signal te_Kat1 and the second catalytic converter temperature signal te_Kat2. The temperature-plateau ascertainment 33 delivers a plateau signal P to the diagnose-enabling 32.

The temperature-plateau ascertainment 33 supplies a plateau-temperature comparator 38 with a plateau-temperature te_P and a plateau length comparator 39 with a plateau length ti_P.

The plateau-temperature comparator 38 is furthermore supplied with a plateau-temperature reference level te_P_Ref provided by a plateau-temperature reference guideline 40. The plateau-temperature comparator 38 provides a plateau-temperature diagnose signal te_P_D of a plateau-expectancy value stipulation 41 and of a diagnose determination 42.

The plateau-length comparator 39 is furthermore supplied with plateau-length reference level ti_P_Ref that is provided by a plateau-length reference stipulation 43. The plateau-length comparator 39 provides a plateau-length diagnose signal ti_P_D of the diagnose determination 42.

The diagnose determination 42 provides a diagnose result D_E.

The plateau expectancy value ascertainment 41 determines a plateau-temperature expectancy value te_P_E.

Figure 2A:
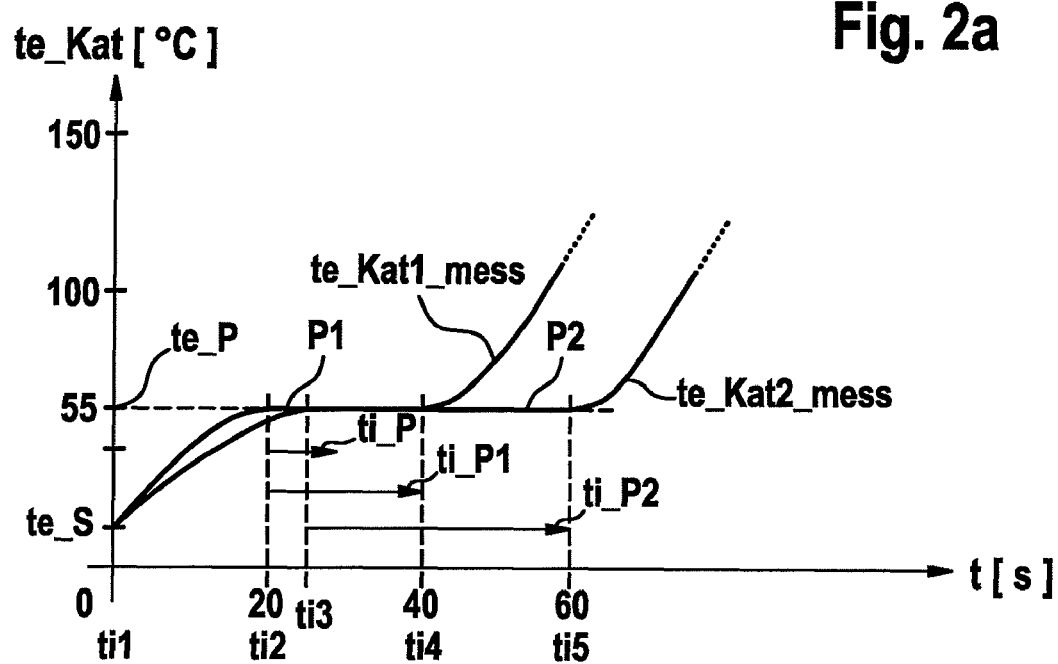
FIGS. 2a, 2b show temperatures of a catalytic converter depending on the time.

FIG. 2a shows the catalytic converter's temperature te_Kat depending on the time t. It displays first and the second catalytic converter temperature signals te_Kat1_mess and te_Kat2_mess, which both start at a first point of time ti1 with a temperature start value te_S.

Both catalytic converter temperature signals te_Kat1_mess and te_Kat2_mess present temperature-plateaus P1 and P2, which shows a plateau temperature te_P, that is for instance 131° F. The temperature-plateaus P1 and P2 show each a plateau-length ti_P.

The first temperature-plateau P1 of the first catalytic converter temperature signal te_Kat1_mess shows a first plateau-length ti_P1, which starts at a second point of time ti2 and ends at a forth point of time ti4. The second temperature-plateau P2 of the second catalytic converter temperature signal te_Kat2_mess shows a second plateau-length ti_P1, which starts at a third point of time ti3 and ends at a fifth point of time ti5.

Figure 2B:
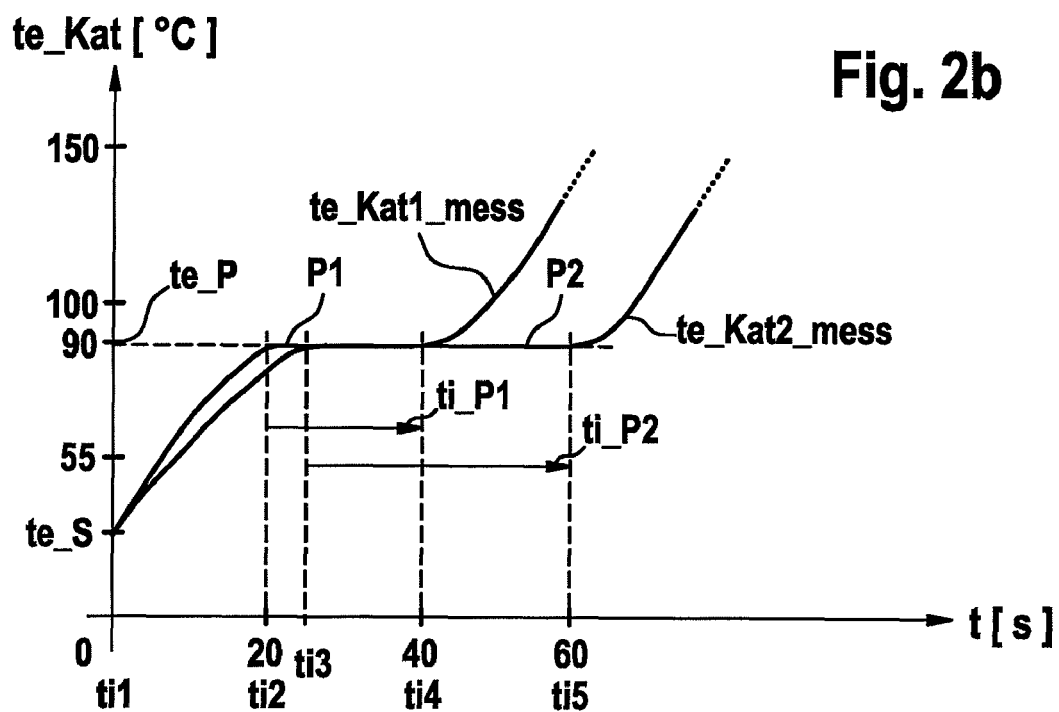

FIG. 2b also shows the catalytic converter temperature te_Kat depending on the time t. The two catalytic converter temperature signals te_Kat1_mess and te_Kat2_mess display each a temperature-plateau P1 and P2, while the plateau-temperature te_P is for example at 194° F.

According to the invention it is proceeded as follows:

The fuel signal stipulation 31 stipulates the fuel signal m_K for instance subject to the air signal ms_L and/or subject to the engine speed n and/or subject to the engine speed set point Md_Soll. The engine speed set point Md_Soll is for example provided by pedal of a motor vehicle which are both not further displayed. The fuel signal m_K stipulates for example the amount of fuel that has to be injected and the fuel injection time of each individual cylinder of the combustion engine 10.

Due to the provided signals the fuel signal stipulation 31 can still determine the calculated dimension ms_abg_mod for the off-gas stream ms_abg s well as the calculated dimension te_agb_mod for the exhaust gas temperature te_abg upstream before the catalytic converter 15. Alternatively or additionally the exhaust gas temperature te_abg can be measured by the exhaust gas temperature sensor 14, which provides the exhaust gas signal te_abg_mess.

According to the invention a diagnose of the catalytic converter 15 is designated, which, in the displayed implementation model, is divided into at least two catalytic sections 16 and 17. A measurement of the catalytic converter temperature te_Kat is required for the implementation of the diagnose. Because of the division into at least two catalytic converter sections 16 and 17, there are at least two catalytic converter temperature sensors 18 and 19 designated, which provide the first catalytic converter temperature signal te_Kat1_mess or the second catalytic converter temperature signal te_Kat2_mess. The division into sections 16 and 17 is not required. In principle the use of one single catalytic converter temperature sensor, which is for example arranged in the rear of the catalytic converter 15 or preferably downstream after the catalytic converter 15, is sufficient. The provision of a measured signal, which is at least one dimension for the catalytic converter temperature te_Kat of the catalytic converter that is supposed to be diagnosed, is elementary.

According to the invention it is designated, that the catalytic converter diagnose rests upon the evaluation of the hygroscopic characteristics of the catalytic converter 15. The hygroscopic characteristics means every interaction between a water film, that has occurred on the inner surface of the catalytic converter 15, and the surface, independent of the physical effect.

During the operation of the combustion engine 10 the occurrence of steam in the exhaust gas area 13 can be expected at all times. The steam develops during the combustion of the air/fuel mixture in the combustion engine 10. Furthermore steam appears due to the humidity of the ambient air, that has been sucked in by the combustion engine 10. The steam concentration in the off-gas area 13 of the combustion engine 10 is around 12.5%, if it is proceeded from a lower relative humidity of the ambient air that has been sucked in by the combustion engine.

In the case of a lower deviation of the dew point the steam in the exhaust gas can condense as a water film on colder surfaces in the off-gas area 13 including the catalytic converter 15.

If a water film occurs on the inner surface of the catalytic converter 15 due to a lower deviation of the dew point, effects occur in the transition area between the water film and the catalytic converter's surface, which are not clarified in every detail. The effects rest upon interactions between the molecules of the water film itself and mostly between the catalytic converter's surface. These effects are identified as hygroscopic characteristics of the catalytic converter 15 in terms of the present application. The hygroscopic characteristics are determined among other things by the adsorption- and/or absorption-processes. It is conceivable that capillary effects are present. Surface tensions and/or gravitational forces between the water film and the inner surface of the catalytic converter 15 potentially play a role.

A water film on the inner surface of the catalytic converter 15 shows a water film steam pressure, which is dependent on the water film temperature. In the following is it assumed that the catalytic converter temperature te_Kat corresponds with the temperature of the water film. The water film steam pressure leads to the evaporation of the water film, while the exhaust gas steam pressure antagonizes this process. A thermodynamic balance exists if the water film steam pressure equals the exhaust gas steam pressure. Then the water film would neither increase nor evaporate. At an exhaust gas steam pressure concentration of 12.5% and a higher exhaust gas pressure than air pressure, the dew point temperature is at about 131° F., if the sucked in ambient air is dry. In the case of a high relative humidity of the ambient air, that has been sucked in by the combustion engine 10, the temperature increases by 41° F., since also the exhaust gas steam concentration increases over 12.5%.

This temperature appears also during the evaporation of the water film. The temperature, that is called plateau-temperature te_P here, changes during the evaporation only marginally. The amount of the evaporated water film or the condensed water steam per time unit is directly proportional to the steam pressure gradient between the water film and the exhaust gas steam.

Based on the start temperature te_S, which is below the plateau-temperature te_P in the displayed implementation model, the first temperature-plateau P1 of the first section 16 of the catalytic converter 15 is achieved by an increase of e.g. the exhaust gas temperature te_abg during the operation of the combustion engine 10 at the second point of time ti2, whereas the plateau-temperature te_P in the displayed implementation model is for example 131° F. The second temperature-plateau P2 of the second catalytic converter section 17 after the second point of time ti2 is achieved not until the third point of time ti3 because of the layout of the second catalytic converter section 17 downstream after the first catalytic converter section 16. The plateau-temperature te_P is the same in both catalytic converter sections 16, 17.

Whether a temperature-plateau P1,P2 is present, is detected by the temperature-plateau ascertainment 33. The detection is based on e.g. the observation of the gradient of the catalytic converter temperature te_Kat. The first and second catalytic converter signals te_Kat1_mess and te_Kat2_mess are evaluated separately in the displayed implementation model.

According to an advantageous configuration, it is designated that the temperature-plateau ascertainment 33 detects a possibly present temperature-plateau P1, P2, only if the diagnose enabling signal D_F is present, which is provided by the diagnose enabling 32.

The diagnose enabling signal D_F can depend on the start signal St of the combustion engine 10. The temperature-plateau P1, P2 occurs in all likelihood after a cold start of the combustion engine 10 or after a restart of the combustion engine 10. Longer operating pauses of the combustion engine 10, which lead to a cooling of the catalytic converter 15, occur especially, if the combustion engine 10 is arranged in a hybrid-vehicle, which provides for a turning-off of the combustion engine 10 during the driving operation.

The diagnose-signal D_F can furthermore depend on the engine temperature re_mot, that is compared to the engine temperature comparator signal S1 in the first comparator 34, which provides the first enabling signal F1 subject to the comparative result. The engine temperature comparator signal S1 is provided by the diagnose enabling 32 for example. It can be either a threshold or a range of tolerance.

Furthermore the boost deactivation signal S_A has to be considered. The boost deactivation signal S_A occurs, if the fuel supply is completely omitted during the operation of the combustion engine 10. There is no energy input in the exhaust gas area 13 during the occurrence of the boost deactivation signal S_A, so that the catalytic converter 15 is cooling down or rather the catalytic converter temperature te_Kat is not increasing due to the simultaneously present high air flow-rate in the exhaust gas area 13.

Furthermore the off-gas stream ms_abg can be considered. The off-gas stream ms_abg, which can be present as exhaust gas volume stream or preferably as exhaust gas mass stream, is compared to the off-gas stream comparator signal S2 in the second comparator 35. The second comparator 35 provides the second enabling signal F2 subject to the comparative result. The off-gas stream comparator signal S2 is provided for example by the diagnose enabling 32. It can be either a threshold or a range of tolerance.

Furthermore the exhaust has temperature te_abg can be considered. The calculated dimension te_abg_mod of the exhaust gas temperature te_abg can be used as well as the exhaust gas temperature signal te_agb_mess that is supplied by the exhaust gas temperature sensor 14. The third comparator 36 compares the exhaust gas temperature te_abg with the exhaust gas temperature comparator signal S3 and provides the third enabling signal F3 depending on the comparative result. The exhaust gas temperature comparator signal S3 is provided for example by the diagnose enabling 32. It can be either a threshold or a range of tolerance.

The catalytic converter temperature te_Kat is furthermore considered very advantageous. The forth comparator 37 compares the catalytic converter temperature te_Kat with the plateau-temperature expectancy value te_P_E in the displayed implementation model. The plateau-temperature expectancy value te_P_E is provided by the plateau-expectancy value stipulation either as a starting figure or as an adapted figure from at least one previous diagnose.

The temperature-plateau ascertainment 33 determines the plateau-temperature te_P as well as the plateau-length ti_P in the displayed implementation model. The plateau-length ti_P is separately determined and provided for the first catalytic converter section 16 into the first plateau-length ti_P1 and for the second catalytic converter section 16 into the second plateau-length ti_P2.

In the displayed implementation model it is assumed that the first plateau-length ti_P1 starts at the second point of time ti2, e.g. at 20 seconds, and stops at the forth point of time, e.g. 40 seconds. In the displayed implementation model it is furthermore assumed that the second plateau-length ti_P2 starts at the third point of time ti3, e.g. at 25 seconds, and stops at the fifth point of time ti5, e.g. at 60 seconds. It is essential that the plateau-temperature te_P of both temperature-plateaus P1, P2 is approximately the same. In the displayed implementation model the plateau-temperature te_P is in FIG. 2a for example at 131° F. and in FIG. 2b for example at 194° F.

The temperature-plateau ascertainment 33 provides the plateau signal P during the detection of a temperature-plateau P1, P2 of the diagnose enabling 32, which can stipulate the first to third comparator signal S1-S3 subject to the present plateau signal P. Preferably at least one of the first to third comparator signals S1-S3 is provided as a range of tolerance with the occurrence of the plateau signal P, which signalizes the beginning of a temperature-plateau P1, P2 at the second or third point of time ti2, ti3. Thus a further ascertainment of the temperature-plateaus P1, P2, especially the ascertainment of the plateau-length ti_P, is only continued if the starting factors lie with the range of tolerance. Otherwise it has to be aborted, since an energy input in the catalytic converter 15 in the plateau-length ti_P comes into play. The influence on the plateau-temperature te_P was experimentally stipulated as low.

It was further experimentally stipulated that the hygroscopic characteristics of the catalytic converter 15 are at least reflected in different plateau-temperatures te_P or different plateau-lengths ti_P. Thereby it was noticed that a higher plateau-temperature te_P can be associated with a better catalytic converter 15 and a lower plateau-temperature te_P can be associated with a worse catalytic converter 15.

The progress of the catalytic converter temperature te_Kat subject to the time t shown in FIG. 2a, correspondents therefore with a comparatively bad catalytic converter 15, while the progress of the catalytic converter temperature te_Kat subject to the time t shown in FIG. 2b, correspondents with a better catalytic converter 15. Accordingly a longer plateau-length ti_P equals a better catalytic converter 15 rather than a shorter plateau-length ti_P.

The effects of the interactions between the water film and the inner surface of the catalytic converter 15 seem to be at least approximately proportional to the active surface in the catalytic converter 15. The bigger the active surface of the catalytic converter 15 is, the better is the catalytic effect. It can be assumed that a higher plateau temperature te_P or a longer plateau-length ti_P provide a bigger active surface so that the conversion ability of the catalytic converter 15 is better than with low plateau-temperatures te_P or short plateau-lengths ti_P.

The plateau-temperature te_P is compared in the plateau-temperature-comparator 38 to a plateau-temperature reference value te_P_Ref, which is supplied by the plateau-temperature reference guideline 40. On the basis of preferably more comparisons of the plateau-temperature te_P with preferably more plateau-temperature-reference values te_P_Ref there is a classification of the catalytic converter 15 with the plateau-temperature-diagnose signal te_P_D. The plateau-temperature reference values te_P_Ref are stipulated for example separately for each type of catalytic converters.

Accordingly the plateau-length ti_P in the plateau-length comparator 39 is compared to the plateau-length reference value ti_P_D, which is provided by the plateau-length reference guideline 43. On the basis of preferably more comparisons of the plateau-temperature te_P with preferably more plateau-length reference values ti_P_Ref there is a classification of the catalytic converter 15 with the plateau-length diagnosis signal ti_P_D. The plateau-length reference values ti_P_Ref are also stipulated for example separately for each type of catalytic converters.

The plateau-temperature diagnose signal te_P_D and/or the plateau-length diagnose signal ti_P_D finally provide the diagnose determination's 42 ascertainment of the diagnose signal D_E, which allows a statement about the conversion ability of the catalytic converter 15. A comparison with the conversion ability of a Grenz catalytic converter can be used by the diagnose signal D_E as a hint for a required exchange of the catalytic converter 15.

The plateau-temperature diagnose signal te_P_D is furthermore provided for the determination of the plateau-expectancy value 41, so that the plateau-temperature expectancy value te_P_E can be adjusted to the current condition of the catalytic converter 15.

The division of the catalytic converter 15 into at least the first and second catalytic converter sections 16 and 17, which are evaluated separately, submits the provision of further information about the local occurrence of a change of the conversion characteristics of the catalytic converter 15. Furthermore the reasonableness regarding the provision of the catalytic converter temperature signals te_Kat1_mess and te_Kat2_mess or rather the signal processing can be checked, because of a comparison of the diagnose results of the two catalytic converter sections 16 and 17.

The invention claimed is:

1. A method of diagnosing a catalytic converter using a customized controller, wherein the catalytic convertor is arranged in an off-gas stream and the diagnosis is based on an evaluation of hygroscopic characteristics of the catalytic converter, the method comprising:
   obtaining a temperature measurement of the catalytic converter with the controller;
   detecting, with the controller, a temperature plateau value of the temperature measurement during evaporation of a water film in the catalytic converter; and
   assigning a parameter to the catalytic convertor designating quality of the catalytic converter, wherein a higher temperature plateau value being attributed to an enhanced quality in comparison to a lower temperature plateau value.

2. A method according to claim 1, further comprising measuring with the controller a plateau-duration and using the plateau-duration for diagnosing operation of the catalytic convertor.

3. A method according to claim 2, further comprising only measuring the plateau-duration when at least one of the following conditions are within a range of tolerance during detection of the temperature plateau: an off-gas stream; an exhaust gas temperature upstream before the catalytic converter; and a temperature of a combustion engine that has the catalytic converter arranged in an exhaust gas area.

4. A method according to claim 3, wherein the range of tolerance is a function of at least of the off-gas stream; the exhaust gas temperature; and the temperature of the combustion engine at a start of detection of the temperature plateau.

5. A method according to claim 1, further comprising scheduling the catalytic converter diagnosis after a cold start of a combustion engine that has the catalytic converter arranged in an off-gas stream area.

6. A method according to claim 1, further comprising scheduling the catalytic converter diagnosis after a boost deactivation of a combustion engine that has the catalytic converter arranged in an off-gas stream area.

7. A method according to claim 1, further comprising scheduling the catalytic converter diagnosis after a turning off and a restarting of a combustion engine that has the catalytic converter arranged in an off-gas stream area.

8. A method according to claim 1, further comprising scheduling the catalytic converter diagnosis when the off-gas stream is below a threshold.

9. A method according to claim 1, wherein the catalytic converter is divided into at least two catalytic converter sections and in that the catalytic converter diagnosis takes place separately for each catalytic converter section.

10. A method according to claim 1, further comprising scheduling ascertainment of the temperature plateau value following decrease of the catalytic converter temperature below a temperature-plateau expectancy value of the temperature plateau value.

11. A method according to claim 10, wherein the temperature-plateau expectancy value is adapted depending on a plateau-temperature diagnose signal.

12. A device for diagnosing a catalytic converter arranged in an off-gas stream, wherein the diagnosis is based on an evaluation of hygroscopic characteristics of the catalytic converter and the device is configured to obtain a temperature measurement of the catalytic converter; detect a temperature plateau value of the temperature measurement during evaporation of a water film in the catalytic converter; and assign a parameter to the catalytic convertor designating quality of the catalytic converter, wherein a higher temperature plateau value being attributed to an enhanced quality in comparison to a lower temperature plateau value.

* * * * *